Dec. 20, 1966   H. VIVEIROS   3,292,296
LURE CHAMBER FISHING ARROW
Filed Oct. 26, 1964
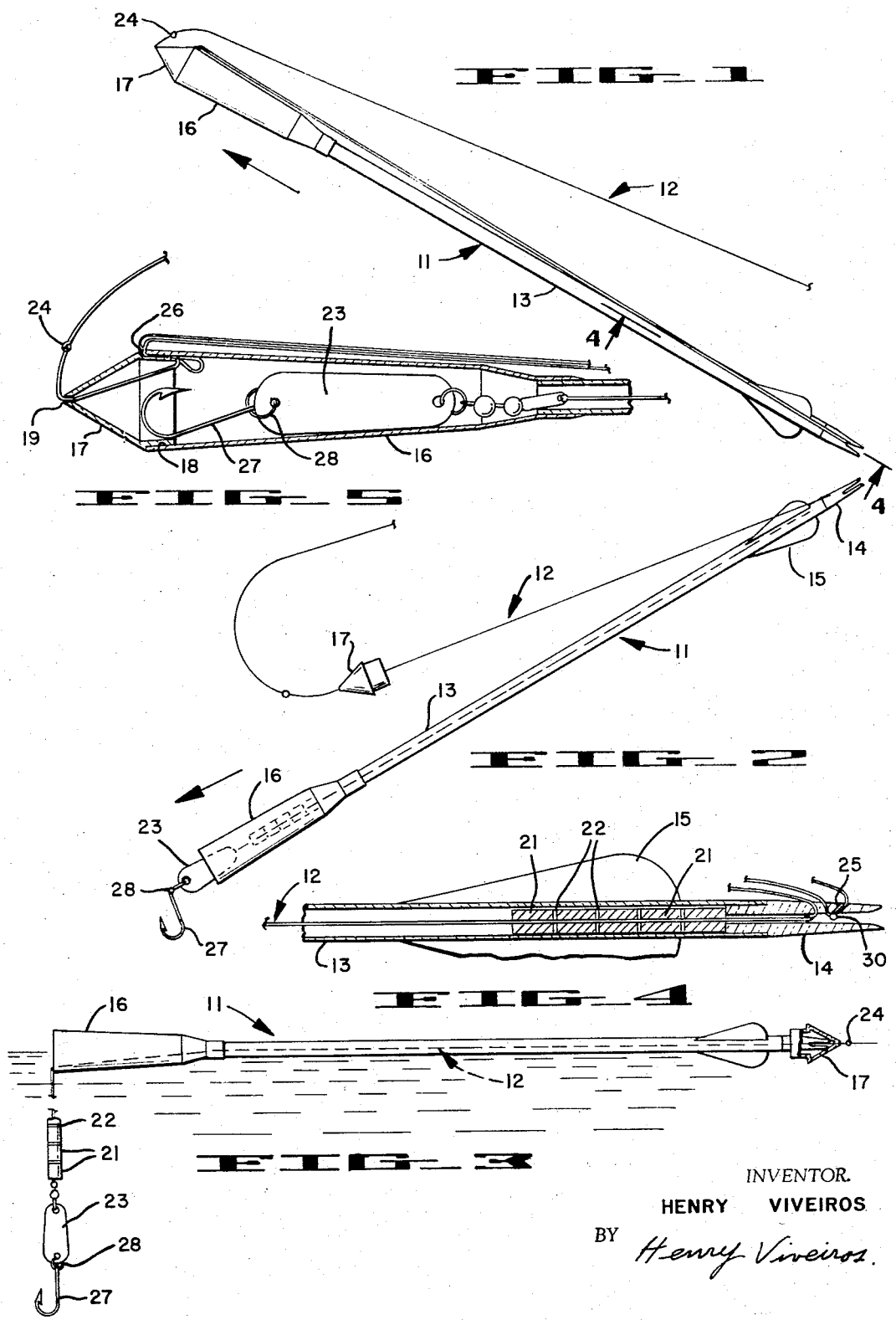
INVENTOR.
HENRY VIVEIROS
BY Henry Viveiros

United States Patent Office 3,292,296
Patented Dec. 20, 1966

3,292,296
LURE CHAMBER FISHING ARROW
Henry Viveiros, 1983 Camden Ave., San Jose, Calif.
Filed Oct. 26, 1964, Ser. No. 407,281
1 Claim. (Cl. 43—19)

The principal object of this invention is the feature of having a fishing apparatus for performing new and unique fishing methods never heretofore having been achieved. Namely, this invention relates to a lure chamber fishing arrow with surf casting equipment such as baited hooks or artificial lure attached to a fishing line, and relates particularly to the associated use of a spinning type fishing reel with appropriate fishing rod and length of fishing line as ordinarily used for ocean, lake or river casting technique. Further, the invention relates to the use of a conventional bow as used by archers in the practice of archery; a crossbow; or other arrow propelling devices.

An object of this invention is to provide a device of the character described which may be used to quickly and easily accommodate a fishing jig contained within the chamber of the arrow, and insure that the bait which is attached to the hook on the end of the fishing line by the user, will reach its intended destination without becoming loose and perhaps lost from the hook during its propelled flight, as is a recurrent problem while angling by present surf casting technique. A feature of the present construction provides a method to contain and protect the lure or bait during flight, and to dispense or free it at the termination of flight outwardly into the water, intended for fishing.

A further object of the present invention is to provide a device of the character described which may be attached to an archery bow or other arrow propelling device that will enable the user to propel the attached baited hooks or lure (fishing jig) to a greater distance and more accurate location than possible with the use of available conventional spinning reel and rod placed into a sand spike, thereby enhancing the possibilities of catching fish.

Another object of the invention is to provide a device of the character described to enable the angler to preset a desired water surface fishing depth, and to troll or retrieve the arrow without the lure or baited hooks going back into the chamber by the use of various methods of knotting the fishing line at the nock prior to propelling the baited hooks or lure from his point of operation to the desired fishing area.

Still another object of the invention is to provide a device of the character described which enables the angler to troll or retrieve the hooked fish, baited hook or lure through the seaweed, kelp or other matter both natural and foreign through fishing waters without entanglement or loss of the aforementioned.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

There are included as a part of the specification drawings illustrative of the invention and briefly described as follows:

FIGURE 1 illustrates the lure chamber fishing arrow ascending in flight.

FIGURE 2 illustrates the lure chamber fishing arrow descending in flight.

FIGURE 3 illustrates the lure chamber fishing arrow floating in the water.

FIGURE 4 is an enlarged fragmentary sectional view of the rear portion.

FIGURE 5 is an enlarged fragmentary sectional view of the forward portion.

In the following specification the lure chamber fishing arrow shall be referred to as just arrow for brevity.

FIGURE 1 illustrates the arrow 11 ascending having been shot from a bow or arrow propelling device, with the trailing end of line 12 being attached to a rod and reel (not shown) which in turn is anchored to a sand spike (also not shown). The arrow 11 has a hollow shaft 13 which has on its rearwardly portion a plug-in nock 14 and fletch 15 and on its forward end an integrally attached lure chamber 16. The removable conical shaped lure chamber head 17 fits into the tapered lure chamber 16 by means of a stepped down shoulder 18 and in its foremost end has an aperture 19 through which line 12 may pass. The sliding sinkers 21 are slid to the rearward end of the shaft prior to shooting, and balance the arrow, thus preventing erratic flight. These sinkers have multipurposes which will be further described in the following sequences.

FIGURE 2 illustrates the arrow 11 during its descent and further illustrates the sequence of motion of the moving parts, namely the sliding sinkers 21 which are now shown as having slid downwardly into the lure chamber 16 dislodging the lure 23 which in turn dislodges the lure chamber head 17 sending it rearwardly along line 12 which is now projecting directly from the nock 14 to the fishing rod.

FIGURE 3 illustrates the arrow 11 floating and the lure 23 and sinkers 21 sinking to the desired depth upon striking the water. The lure chamber head 17 is shown lodged over the nock 14 thus becoming a seaweed deflector. A knot 24 tied at a predetermined distance restricts the depth that the lure 23 will sink as the knot will not pass through the aperture 19 in the lure chamber head 17. The knot 24 would be eliminated if bottom fishing is the desired choice.

FIGURE 4 clearly illustrates the rearmost portion of the arrow 11 in section. The cylindrically shaped sliding sinkers 21 are shown in pre-flight position. Between the sinkers 21 are positioned disk shaped spacers 22 which protect the sinkers from any deformation during impact upon sliding upward and downward within the hollow shaft 13. The sinkers 21 would be of a heavy non-rusting material such as brass and the spacers 22 could be Teflon or such. The sinkers 21 and spacers 22, and the plug-in nock 14 have a centrally located aperture through which line 12 may pass. It should be noted that the line 12 passes through an opening 25 in nock 14, this opening 25 is on an angle to the longitudinal center line of the shaft 13 which prevents the lure 23 from being pulled back into the chamber 16 by means of frictional drag when the arrow 11 is being retrieved into shore or boat. It should be further noted that knot 30 is tied between the centrally located aperture and opening 25 of the nock 14 to inhibit the lure 23 from going back into the chamber 16 when the arrow 11 is being retrieved. The latter is preferred for surf fishing, thus the knot 30 has a twofold purpose to sink the lure 23 to a predetermined depth, and to retrieve the arrow 11 without the lure 23 going back into the chamber.

FIGURE 5 illustrates the forward assembled portion of the arrow 11 before shooting. The lure 23 has been pulled into the chamber 16 by a portion of line 12 which is threaded through the hollow shaft 13 and weights 21. The line 12 is then doubled and is threaded taut from the centrally located aperture in nock 14 past the chamber 16 and between the edge of chamber 16 and the chamber head 17 as designated by 26, one strand of the doubled portion of the line is threaded through the opening 25 in nock 14 as illustrated in FIGURE 4, past the chamber 16 and between the edge of chamber 16 and the chamber head 17 as further designated by 26. The line 12 passes through the aperture 19 in chamber head 17 and capped. The knot 30 is tied prior to threading the line 12. It should be noted that 26 is illustrated by two lines, one line 12 is looped in the chamber 16 representing a doubled-back line, the other line 12 illustrates the line from the opening 25 in nock 14 through the aperture 19 in the chamber head 17. A hook 27 is connected to the lure 23 by means of a safety ring 28 which has a lesser breaking pull than the line 12, thus preventing loss of the arrow should the hook 27 becoming snagged on any object, only the hook 27 and bait would be lost. The reloading process is simple due to the design of this invention, as the baited hook 27 and lure 23 is pulled back into the chamber 16, and the line 12 is rethreaded as aforementioned, and the chamber head 17 is recapped. The arrow 11 is held upended to allow the sliding sinkers 21 to locate in the shooting position.

While the salient features of this invention have been described in detail with respect to a certain embodiment thereof, it will of course be apparent that certain modifications may be made within the spirit and scope of this invention, and it is not desired therefore to limit the invention to the exact details shown except insofar as they may be defined in the following claim.

What is claimed is:

A casting arrow comprising a hollow shaft, a nock on one end of said hollow shaft provided with a longitudinal bore, a chamber forming element on the other end of said shaft having an enlarged open end, a hollow chamber head having a portion seated within said enlarged open end to provide a releasable closure for said chamber element, said chamber head having a line receiving aperture therein, a plurality of weights having through bores slidably received in said hollow shaft, said nock having a line receiving aperture therein, a fishing lure, a line connected at one end to said lure and adapted to have its other end connected to a reel, said line having a portion adjacent said lure threaded through said hollow shaft, said weights, and said longitudinal bore in said nock, a second portion joined to said first portion and extending from said nock along the exterior of said hollow shaft and chamber element and releasably secured between said chamber element and chamber head, and a third portion extending outwardly through said aperture in said nock to a position between said chamber element and chamber head and then outwardly through said aperture in said chamber head to said reel.

References Cited by the Examiner

UNITED STATES PATENTS

| | | | |
|---|---|---|---|
| 1,842,540 | 1/1932 | Cowdery | 273—106.5 |
| 2,531,418 | 11/1950 | Fitzharris | 43—43.14 X |
| 2,768,468 | 10/1956 | Kibler et al. | 43—43.12 |
| 3,059,370 | 10/1962 | Moore | 43—41.2 X |
| 3,084,467 | 4/1963 | Bromwell | 43—19 |

SAMUEL KOREN, *Primary Examiner.*

W. H. CAMP, *Assistant Examiner.*